United States Patent

Nguyen et al.

[11] Patent Number: 6,148,040
[45] Date of Patent: Nov. 14, 2000

[54] PRECODED GAUSSIAN MINIMUM SHIFT KEYING CARRIER TRACKING LOOP

[75] Inventors: Tien M. Nguyen, Placentia; John M. Charroux, Torrance, both of Calif.

[73] Assignee: The Aerospace Corporation, El Segundo, Calif.

[21] Appl. No.: 09/431,343

[22] Filed: Oct. 29, 1999

[51] Int. Cl.$^7$ .................................................. H04L 27/14
[52] U.S. Cl. ............................................................ 375/326
[58] Field of Search .................................. 375/336, 326, 375/335, 274; 329/300, 302

[56] References Cited

U.S. PATENT DOCUMENTS

4,336,500   6/1982   Attwood ..................................... 329/50
5,115,454   5/1992   Kucar ....................................... 375/321

Primary Examiner—Temesghen Ghebretinsae
Attorney, Agent, or Firm—Derrick Michael Reid

[57] ABSTRACT

An improved Gaussian minimum shift keying (GMSK) carrier tracking loop operating at baseband takes advantage of the orthogonality of precoded data GMSK signals and Laurent filtering to provide a carrier phase error signal generated at baseband for carrier phase derotation of the received GMSK signal. The carrier tracking loop also provides demodulated data estimates with performance equal to that of a GMSK serial demodulator. The tracking loop uses data directed feedback to improve noise rejection, but still has fast acquisition by operating at baseband.

13 Claims, 3 Drawing Sheets

PRECODED GMSK CARRIER TRACKING LOOP

PRECODED GMSK COMMUNICATION SYSTEM

FIG. 1

PRECODED GMSK CARRIER TRACKING LOOP

FIG. 2

CARRIER PHASE JITTER PLOT

FIG. 3

PRECODED GAUSSIAN MINIMUM SHIFT KEYING CARRIER TRACKING LOOP

REFERENCE TO RELATED APPLICATIONS

The present application is related to assignee's copending application entitled "Gaussian Minimum Shift Keying (GMSK) Precoding Communication Method" Ser. No.: 09/390,966, filed Sep. 07, 1999, by the inventors G. Lui and K. Tsai, and related to assignee's copending application entitled "Digital Timing Recovery Loop for GMSK Demodulators" Ser. No. 09/307,231, filed May 07, 1999, by the inventors T. Nguyen, J. Holmes, and S. Raghavan, both of which are here incorporated by reference as there fully set forth.

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of continuous phase modulation communication systems. More particularly, the present invention is related to Gaussian minimum shift keying carrier tracking loops for use in combination with data preceding.

BACKGROUND OF THE INVENTION

Communication systems have long transmitted digital signals using various carrier modulation techniques. The spectrum of a digital signal can be controlled and made compact by envelope filtering or phase domain filtering. An efficient phase domain filtering approach controls the signal spectrum by frequency modulating the filtered signal onto a carrier frequency to form a continuous phase modulated (CPM) signal. Because the CPM signal has a constant envelope, a power amplifier can be operated at maximum output power without affecting the spectrum of the filtered signal. Gaussian minimum shift keying (GMSK) is a form of continuous phase modulation. GMSK uses CPM signals with a constant signal envelope and a spectrum that can be made compact with the appropriate choice of the signal bandwidth bit time product (BT) product.

An M-ary GMSK signal is defined by its complex envelope described in terms of symbol energy E, symbol period T, carrier phase $\theta_c$ and phase modulation $\theta(t)$ using a modulation index h. Input data is formatted into data symbols prior to carrier modulation and transmission. The data formatting may be non-return to zero (NRZ) formatting. Equally probable NRZ data symbols belong to an M-ary alphabet of symbols having the symbol time T. The M-ary symbols are used to phase modulate a carrier reference. The GMSK phase response $\theta(t)$ originates from a Gaussian filter response g(t) of a Gaussian smoothing filter with a single sided 3 dB bandwidth B, truncated to an intersymbol interval duration L, that is a memory truncation length L. The GMSK Gaussian filter with a memory truncation length L of a GMSK signal is defined by the BT bandwidth bit time product, where B is the single sided 3 dB filter bandwidth in hertz. The Gaussian filter with a small BT product, has a memory length L equal to 1/BT. The Gaussian filter response g(t) used to phase modulate the carrier by a phase modulator having a modulation index h. In general, lowering the modulation index h while keeping the BT product constant will further reduce the spectral occupancy. The intersymbol memory length L is the number of elapsed symbol periods for the GMSK signal to accrue a complete phase change amount due to a single input symbol and hence represents the memory of the GMSK signal. The phase modulated GMSK signal is transmitted to GMSK receiver for communicating the input data stream.

The GMSK receiver demodulates the received GMSK signal into a demodulated signal that is in turn passed through Laurent filters providing filter signals fed into a Viterbi decoder for providing a estimate of the input data stream. The Laurent filters are applied to an accumulated phase at a current bit time. The current bit has signal components extending over L bit periods. A typical coherent receiver for M-ary GMSK signal is based on a pulse amplitude modulation (PAM) representation of CPM signals using Laurent filtering, and employs the Viterbi algorithm to optimally demodulate symbol sequences. In demodulating M-ary GMSK signals using the Viterbi algorithm, a differential decoder has been necessary to resolve data bit ambiguities while providing a nominal bit error rate (BER) that is desirably as small as practicable. A Viterbi algorithm typically employs a sliding window in the demodulation process where the width of the sliding window represents the demodulation memory or delay. The surviving state sequence produced by the sliding window Viterbi algorithm at stage n depends on all the demodulated symbols $d_n(t)$. The intrinsic data dependency of the survivor sequences $a_n(t)$ disadvantageously requires a differential decoder operation in the receiver when deciding on the actual demodulated symbol from successive survivors of the Viterbi algorithm resulting in a differential bit error rate degradation.

In the related application, Nguyen et. al., an improved GMSK timing recover loop offers closed loop generation of a data timing signal at a baseband frequency. The improved GMSK timing recovery loop enables recovery of the transmitted data using the baseband data timing signal $\tau(t)$ with high accuracy at low bit signal to noise ratio (BSNR) and at a small BT product, and has the advantage of negligible loss due to non-random data patterns. Another advantage associated with GMSK timing recovery loop is the adoption of the well known digital transition tracking loop (DTTL) used in M-ary PSK systems with a modification of adding a hard limiter in closed loop control of the data timing signal.

The GMSK system includes the transmitter modulator and the receiver demodulator between which is transmitted the GMSK signal. The demodulator includes a carrier tracking loop for providing a GMSK demodulated received signal $R_o(t)$ and the bit timing recovery loop for providing the bit timing signal $\tau(t)$. The carrier tracking loop preferably employs reverse modulation. The GMSK timing recovery loop performance employs the hard limiter adjusted by a bit timing error signal for improved insensitivity to the values of BT while operating at low BSNR. The GMSK timing recovery loop takes advantage of the observation that the cosine of the baseband GMSK signal has zero crossings at multiples of the bit duration. The hard limiter is used to create the clocking signal for the NRZ data stream that has the zero crossings at multiples of the bit duration. The digital transition tracking loop is then used to track the zero crossings of the NRZ data stream clocking signal from the received demodulated GMSK signal, and the bit timing signal $\tau(t)$ is then generated by the DTTL with less jitter for improved data detection. In the GMSK timing recovery loop, the hard limiter is adjusted by the bit timing error signal $\tau_e(t)$ to reduced jitter in clock sampling of the NRZ data stream. Hence, the digital transition tracking loop tracks the adjusted zero-crossings of the NRZ data stream, and the reduced jitter bit timing signal τ(t) is then generated for accurate data sampling and detection. Significantly, this timing recovery loop is operated at baseband and is a preferred improvement to the GMSK receiver.

In the related application, Lui et. al., a data preceding algorithm is implemented prior to modulation in the transmitter to substantially improve the resulting BER performance of the continuous phase modulated (CPM) transmitters and receivers, such as the Gaussian minimum shift keying (GMSK) transmitters and receivers without the use of differential decoders while preserving the spectral occupancy the GMSK signals. The preceding algorithm encodes the source NRZ data symbols prior to the GMSK modulation so that the cumulative phase of the precoded symbols becomes the absolute phase of the data symbols in the signal phase trellis of the Viterbi algorithm. The preceding algorithm offers performance improvement for M-ary coherently demodulated GMSK signals.

Precoding improves the BER performance for coherent demodulation of the M-ary GMSK signals implemented using a pulse amplitude modulated signal subject to the Viterbi algorithm. The preceding algorithms encodes the source NRZ data symbols $d_n(t)$ prior to the GMSK modulation so that the cumulative phase of the precoded symbols $d_n(t)$ is identical to the exact phase of the source NRZ symbols at every stage of the Viterbi algorithm. In the Viterbi algorithm, the preceding process produces a set of survivor sequences for estimating the original data bit without the use of differential decoding. The Gaussian filter can be expressed mathematically, and the Laurent mathematical expansion dictates the matched filter bank. Without preceding, the Gaussian filter creates phase ambiguities that are resolved by differential decoding. Because the precoded symbols have the same statistics as the source symbols, the transmit spectrum of the GMSK signal is preserved while eliminating the need for differential decoding. Depending upon the channel bit error rate in operation, the precoding method will render a signal to noise ratio (SNR) improvement of 3 dB over the same modem that demodulates GMSK signals without preceding.

The carrier phase demodulation of the received signal has long been performed at high intermediate frequencies (IF) causing squaring signal losses and consuming high power when demodulating at the IF frequencies. The squaring losses disadvantageously increase the bit error rate. The techniques used for carrier phase synchronization usually require squaring or Costas loops with losses due to squaring, and self noise due to intersymbol interference (ISI) with high BER. These carrier tracking loops do not perform well in the presence of non-random data patterns where the discrete components for carrier recovery may vanish.

A reverse modulation method may be used in carrier phase tracking loops operating at high intermediate frequencies. The reverse modulation method works very well with differentially encoded data. However, when used with the precoded data, the tracking performance becomes unstable and sensitive to the loop gain. Additionally, when operating at high intermediate frequencies, more power is disadvantageously consumed. While prior GMSK systems have used preceding to avoid receiver differential decoding, the precoded data absolute phase characteristics have not been used for baseband operation of a carrier tracking loop. These and other disadvantages are solved or reduced using the invention.

SUMMARY OF THE INVENTION

An object of the invention is to provide carrier phase tracking using data precoded GMSK signals.

Another object of the invention is to provide carrier phase tracking operating baseband frequencies of a demodulated received signal.

Yet another object of the invention is to provide carrier phase tracking operating at baseband frequencies to conserve power consumption.

The present invention is directed to an improved GMSK carrier tracking loop operating at baseband while taking advantage of the orthogonality of precoded data GMSK signals and the absolute phase of the PAM filtered signals. As a precondition, the transmitted data sequence d(t) is precoded in the transmitter and communicated by Gaussian filtering and phase modulation of a carrier reference $f_c$ to provide a transmitted GMSK signal to a receiver. The GMSK carrier tracking loop carrier and phase demodulates the received GMSK signal R(t) into a baseband demodulated received $R_o(t)$ signal that is then separated into real inphase (I) and imaginary quadrature phase (Q) components both subjected to Laurent filtering to provide rough estimates of the baseband data signals of encoded data. Orthogonal switching and hard limiting is used to generate data $\hat{A}_n$ and $\hat{B}_n$ estimates, and of respective Q and I components at baseband. The $\hat{A}_n$ and $\hat{B}_n$ data estimates and $\theta_I$ and $\theta_Q$ phase error signals are cross-multiplied together for generating a phase error in closed loop carrier phase tracking at baseband. These and other advantages will become more apparent from the following detailed description of the preferred embodiment.

DETAILED DESCRIPTION OF THE PREFERRED EMBODIMENT

Figure 1:
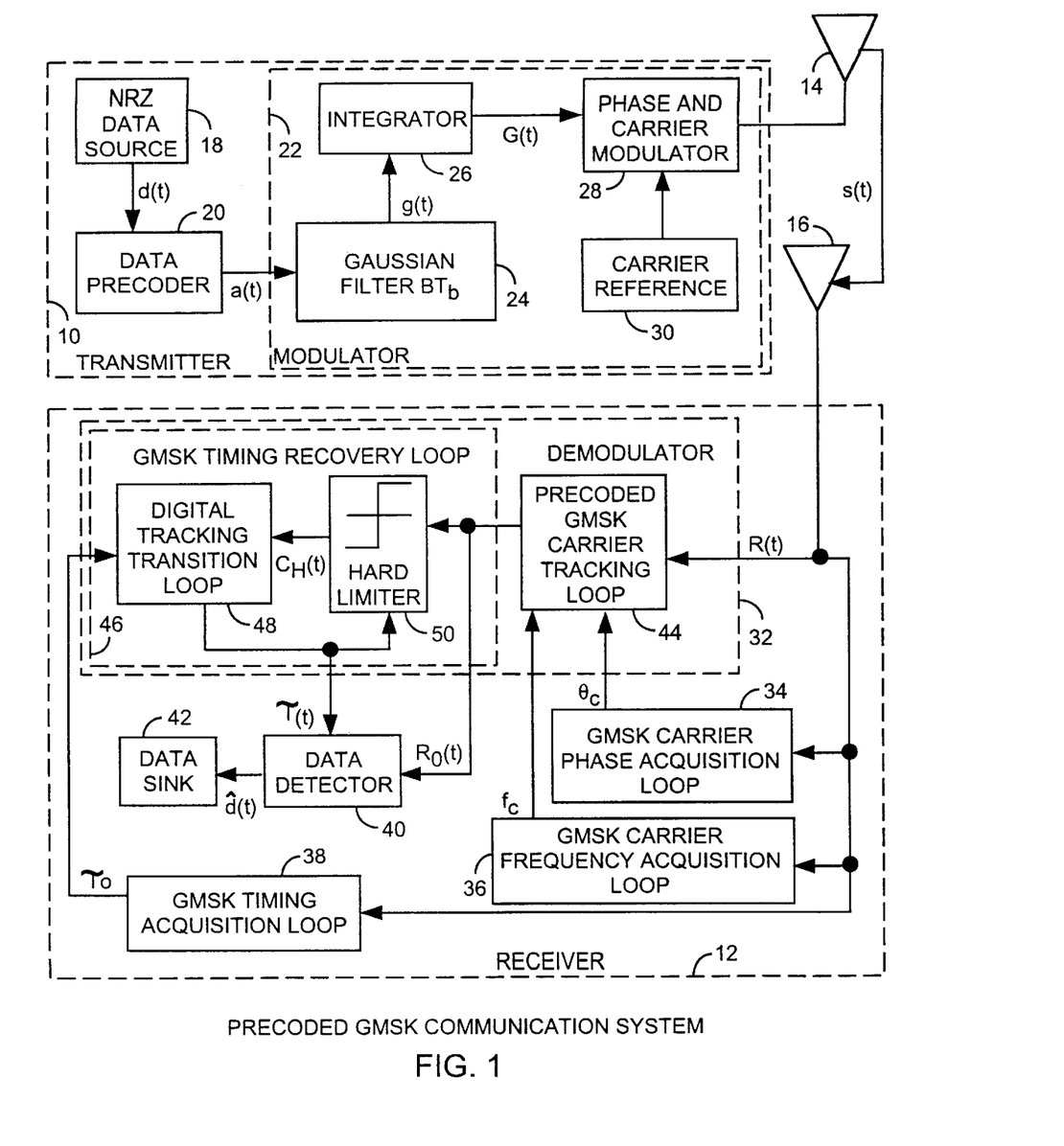
FIG. 1 is a block diagram of a precoded GMSK communication system.

An embodiment of the invention is described with reference to the figures using reference designations as shown in the figures. Referring to FIG. 1, a precode GMSK communication system includes a GMSK transmitter 10 and receiver 12 for communicating a GMSK signal S(t) from a transmitting antenna 14 to a receiver 16 antenna providing an intermediate frequency (IF) received signal R(t) received by a GMSK receiver 12. The GMSK signal S(t) is subjected to noise and interference, both not shown, during communication of the signal. The transmitter 10 includes a data source 18 that may be a non-return to zero (NRZ) formatted data source providing a data stream d(t) to a data precoder 20 providing in turn a sequence of precoded symbols a(t) where a(t) is defined as $a_n(t)=d_{n-1}(t)d_n(-1)^n$ having bit duration of T for the nth bit with a bit rate of $R_b$. The precoded symbols a(t) are communicated to a modulator 22 that includes a Gaussian filter 24 having a predetermined bandwidth bit-time product $BT_b$. The Gaussian filter 24 receives the encoded symbols a(t) as +/−1 volt pulses to generate respective Gaussian filter pulse responses g(t) overlapped by memory length L and communicated to an integrator 26 providing an accumulative Gaussian filter response signal G(t) that is in turn communicated to a phase modulator 28 that phase modulates a $f_c$ carrier reference 30 by the accumulative Gaussian filter response signal G(t) to provide the GMSK signal S(t). Gaussian filter responses g(t) for the symbols a(t) are superimposed over the time period of the memory truncation length L and communicated to the integrator 26 when generating a complete Gaussian filter response G(t) communicated to the phase modulator 28 providing the GMSK signal S(t) as a continuous phase modulated (CPM) signal. The phase modulator 28 is defined by a modulation index h. The respective Gaussian pulse responses g(t) of the Gaussian filter 24 is a function of the BT product and the truncation memory length L. The phase modulation $\phi(t)$ is equal to the $\pi hG(t)$. The accumulative Gaussian filtered response G(t) is phase modulated by the phase modulator 28 to generate the CPM GMSK signal S(t) having a constant envelope. The receiver 12 receives the transmitted GMSK signal S(t) as the received signal $R_c(t)$ is a function of the transmitted signal and a noise component.

$$S(t) = e^{j\phi(t)} e^{j\omega_c t} e^{j\phi_e}$$

$$R_c(t) = S(t) e^{-j\omega_c t} = e^{j\phi(t)} e^{j\theta_e} + \tilde{n}_0(t)$$

The function of the receiver 10 is to generate an estimate $\hat{d}(t)$ of the original data stream d(t). The receiver 12 including a demodulator 32 receives the received signal R(t) for generating a baseband signal $R_o(t)$ for data recovery. The received signal R(t) is also communicated to a GMSK carrier phase acquisition loop 34 providing a carrier phase estimate $\theta_c$, to a GMSK carrier frequency acquisition providing a carrier frequency estimate $f_c$, and to a GMSK timing acquisition loop 38 providing an initial tracking timing signal $\tau_o$. A data detector 40 generates the estimated data $\hat{d}(t)$ communicated to a data sink 42. The data detector 40 receives the received baseband signal $R_o(t)$ from a precoded GMSK carrier tracking loop 44 and a data timing $\tau(t)$ signal from a GMSK timing recovery loop 46 preferably including a digital tracking transition loop 48 and a hard limiter 50. The digital tracking transition loop 48 provides the data timing signal $\tau(t)$ to the data detector 40 for recovery data estimation. The data timing signal $\tau(t)$ is received by the hard limiter 50 providing a hard clocking signal $C_H(t)$ to the digital tracking transition loop 48 in closed loop control for rapidly stabilizing the data signal $\tau(t)$ at baseband for clocking the data detector 40. The data detector 40 is preferably a trellis receiver having Viterbi decoding and Laurent matched filtering. The data detector 40 preferably includes a Laurent filtering, data sampling and Viterbi decoding for providing the data estimate $\hat{d}(t)$. The received baseband signal $R_o(t)$ is a representation of the output of the integrator 26. The timing recovery loop 46 in combination with the data detector 40 is an inverse function of the data precoder 20, Gaussian filter 24 and integrator 26, to provide the estimated data $\hat{d}(t)$. Loops 34, 36 and 38 may be of conventional designs. The invention is directed to the precoded GMSK carrier tracking loop 44 shown in detail in FIG. 2.

Figure 2:
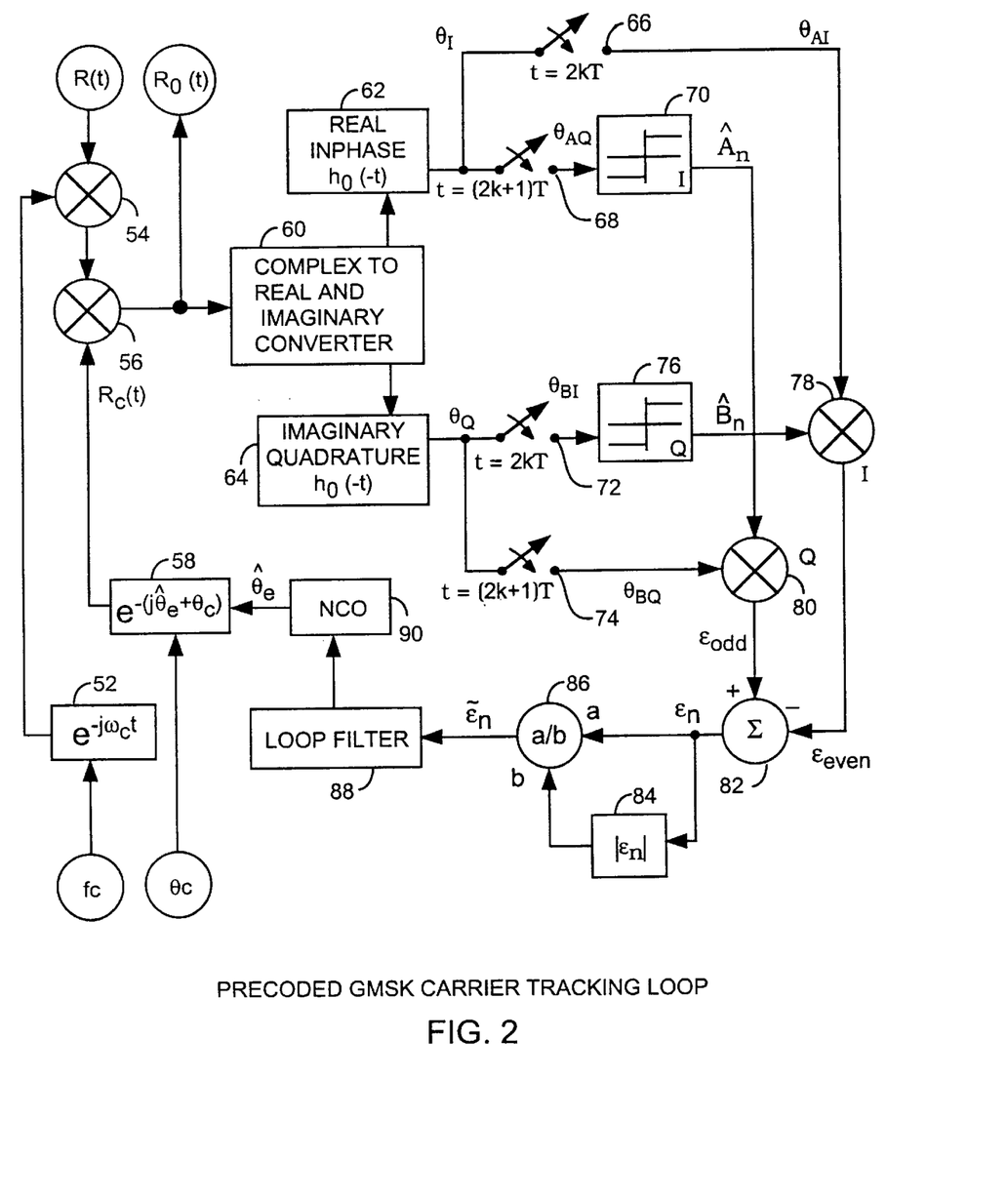
FIG. 2 is a block diagram of a precoded GMSK carrier tracking Loop.
Figure 3:
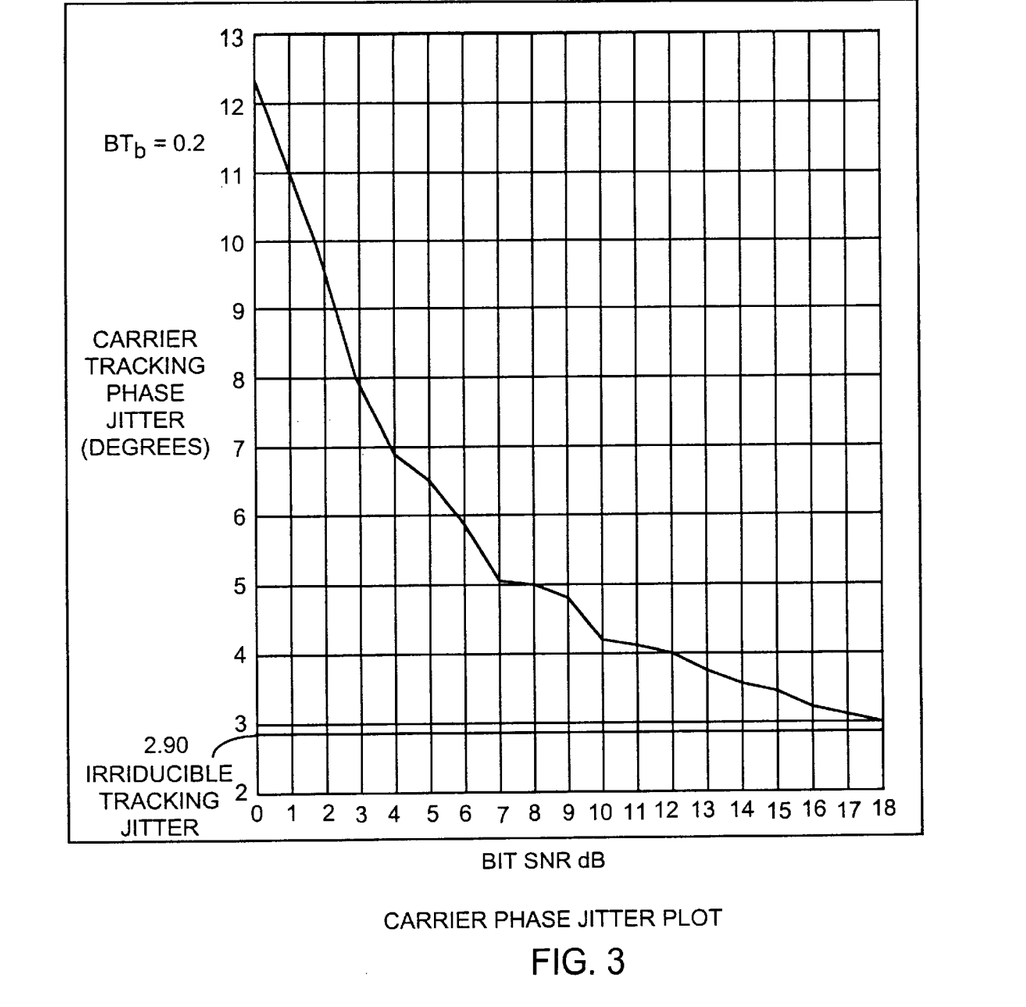
FIG. 3 is a plot of carrier tracking phase jitter in degrees as a function of bit signal-to-noise ratio.

Referring to FIGS. 1 and 2, and more particularly to FIG. 2, the improved precoded GMSK carrier tracking loop 44 receives the carrier frequency estimate $f_c$ and carrier phase estimate $\theta_c$ to provide a carrier demodulated and phase adjusted baseband received signal $R_o(t)$. The carrier signal $f_c$ is received by a carrier receiver 52 to provide a carrier demodulation signal to a carrier demodulator 54 that demodulates the received signal R(t) into a carrier demodulated baseband received signal $R_c(t)$ that is then communicated to a phase demodulator 56 that removes the carrier phase $\theta_c$ and a phase error $\theta_e$ from a phase receiver 58 to then provide the carrier and phase demodulated baseband received signal $R_o(t)$. The demodulated baseband received signal $R_o(t)$ is a function of the received signal R(t) that can expressed as a complex baseband signal.

$$R_0(t) = R_c(t) e^{-j\hat{\theta}}$$

$$e^{j\phi(t)} \cong \frac{\sqrt{2E_b}}{T} \sum_{n=0}^{\infty} a_{0,n} h_0(t - nT)$$

$$e_{j\phi(t)} \cong \frac{\sqrt{2e_b}}{T} \left[ \sum_{n=odd}^{\infty} d_n h_0(t - nT) + j \sum_{n=even}^{\infty} d_n h_0(t - nT) \right]$$

The demodulated baseband received signal $R_o(t)$ is received by a complex to real and imaginary converter 60 to provide a real inphase Q component and an imaginary quadrature I component respectively communicated to a fundamental PAM real inphase filter $h_0(t)$ 62 and to a fundamental PAM imaginary quadrature filter $h_0(t)$ 64 to respectively provide a $\theta_I$ PAM filtered signal and a $\theta_Q$ PAM filtered signal. The $\theta_I$ and $\theta_Q$ PAM filtered signals from the PAM filters 62 and 64 are baseband signals having time varying positive and negative phase values corresponding to positive and negative pulses of the input data precoded sequence a(t).

$$a_{0,n} = J(n) d_n, \quad J(n) = \left\{ \begin{array}{l} j, n = \text{even} \\ j, n = \text{odd} \end{array} \right\}$$

The $\theta_I$ PAM filter signal from the PAM real filter 62 is communicated to a 2kT sample and hold switch 66 providing an even sampled phase $\theta_{AI}$ and communicated to a (2k+1)T sample and hold switch 68 providing an odd sampled phase $\theta_{AQ}$ that is communicated connected to an I hard limiter 70. The I hard limiter 70 provides zero and one hard limited estimated data $\hat{A}_n$ representing the odd sampled phase $\theta_{AQ}$ from the sampled and held switch 68 sampling at odd sample times (2k+1)T. The inphase filtered signal $\theta_I$ is sampled and held by switch 68 at the beginning of the odd sample times for one bit period T. That is, the sampling switch 66 provides the even sample phase $\theta_{AI}$ by sampling the real PAM filtered signal $\theta_I$ at the beginning of even sample times 2kT and holding the sampled value for one bit duration T. The $\theta_Q$ PAM filtered signal from the Imaginary PAM filter 64 is communicated to a 2kT sample and hold switch 72 providing a Q even sampled phase $\theta_{BI}$ and to a (2k+1)T sample and hold switch 74 providing a Q odd sampled phase $\theta_{BQ}$ that is then communicated to a Q hard limiter 76. The $\theta_{BI}$ sampled phase output from the sampling switch 72 is fed into a Q hard limiter 76 for providing a hard limited estimated data $\hat{B}_n$. The estimated data sequences $\hat{B}_n$ and $\hat{A}_n$ are estimated data of the precoded sequences because the absolute phase of the phase of real and imaginary PAM filter signals $\theta_I$ and $\theta_Q$ correspond to the precoded data sequence a(t) at symbol boundaries.

Sampling switches 66 and 72 operate in synchronism clocking at 2kT even symbol boundaries, whereas sampling switches 68 and 74 operate in synchronism clocking at (2k+1)T odd symbol boundaries. The term k is an incrementing integer index for consecutive symbol boundary times. The switches 66, 68, 72 and 74 are switched at multiples of T, the symbol time period, when the outputs of 66, 68, 72 and 74 are held through the symbol time T. Switches 66 and 72 synchronously respectively sample Q and I PAM filtered outputs $\theta_Q$ and $\theta_I$ at times 2kT, and switches 68 and 74 sample Q and I PAM filtered outputs $\theta_Q$ and $\theta_I$ at times (2k+1)T. The output of the sampling switches 66, 68, 72 and 74 provide sampled phase values that are positive and negative and between +1 and −1 indicating a phase rotation and therefore indicating binary values of data bits of the precoded sequence a(t).

Positive and negative encoded bits $B_n$ and $A_n$ are demodulated, converted, filtered and sampled to provide sample phase outputs $\theta_{AI}$, $\theta_{AQ}$, $\theta_{BI}$, and $\theta_{BQ}$, from switches 66, 68, 72 and 74, respectively. The sampled phase outputs $\theta_{AQ}$ is hard limited by the Q hard limiter 70 to provide the real data estimate $\hat{A}_n$, and the sampled phase outputs $\theta_{BI}$ is hard limited by the I hard limiter 76 to provide the imaginary data estimate $\hat{B}_n$. The real and imaginary data estimates $\hat{A}_n$ and $\hat{B}_n$ provide alternating estimated data bits, that when combined, reconstitutes the original data stream d(t). The Q and I multipliers 78 and 80 determine the actual phase difference between perfect demodulation of the data estimates $\hat{B}_n$ and $\hat{A}_n$ with the current phase $\theta_{AI}$ and $\theta_{BQ}$, respectively, to derive phase error signals $\epsilon_{even}$ and $\epsilon_{odd}$, respectively, that are summed by summer 82 into a total phase error $\epsilon_n$.

Switches 66 and 72 are orthogonally switched in synchronism and operate in combination with hard limiters 70 and 76, multipliers 78 and 80, and summer 82 to provide a total error signal $\epsilon_n$. The hard limiter outputs $\hat{A}_n$ and $\hat{B}_n$ provide absolute +/−1 data signals as sign indicators for determining the total error signal $\epsilon_n$. The sampled phase outputs $\theta_{AI}$ and $\theta_{BQ}$ are values providing a measure of how close the phase values are to zero at the time of orthogonal clocking of the hard limiters 70, and 76, respectively, generating actual data estimates at perfect modulation. The phase output value of $\theta_{AI}$ from switch 66 is at zero during perfect timing when hard limiter 76 is orthogonally clocked, and the phase output value of $\theta_{BI}$ is at zero during perfect timing when hard limiter 70 is orthogonally clocked. Hence, the hard limiters provide alternating data estimates $\hat{B}_n$ and $\hat{A}_n$ using orthogonally sampled filtered signal $\theta_{BI}$ and $\theta_{AI}$. The sample phase outputs $\theta_{AI}$ and $\theta_{BQ}$ are at zero during perfect timing when hard limiters 70 and 76 are orthogonally clocked. When the clocking is not perfect, the output of the multipliers 78 and 80 will provide I and Q phase errors $\epsilon_{even}$ and $\epsilon_{odd}$, respectively, that are summed by the summer 82 providing the total error signal $\epsilon_n$.

The switches 66 and 72 synchronously switch at even number symbol boundaries. When the switch 66 is clocking on even number symbol boundaries, the real inphase phase of the I PAM filtered signal $\theta_I$ is near to a zero or small phase shift value. The larger the phase shift error, the more out of phase the clocking is to the true symbol boundary and hence the larger is the real inphase phase shift error $\theta_{IA}$. The imaginary quadrature Q PAM filtered signal $\theta_Q$ is at a maximum phase for providing the bit estimate $\hat{B}_n$ for providing a correct sign of the phase error as sampled by switch 66 on the even symbol boundaries. The I multiplier 78 multiplies the imaginary data estimate $\hat{B}_n$ as the sign of the real phase error, by the magnitude of the real inphase phase error $\theta_{AI}$ to obtain a sign and magnitude product defining the phase error of the real I PAM filtered signal $\theta_I$ to provide the inphase phase error $\epsilon_{even}$.

The switches 68 and 74 synchronously switch at odd number symbol boundaries. When the switch 74 is clocking on odd number symbol boundaries, the imaginary quadrature phase of the Q PAM filtered signal $\theta_Q$ is near or at a zero phase shift value. The larger the phase shift error, the more out of phase the clocking is to the true symbol boundary and hence the larger is the quadrature phase error $\theta_{BQ}$. The real inphase I PAM filtered signal $\theta_I$ is at a maximum phase for providing the bit estimate $\hat{A}_n$ for providing a correct sign of the phase error $\theta_{BQ}$ as sampled by switch 74 on the odd symbol boundaries. The Q multiplier 80 multiplies the sign of the real data estimate $\hat{A}_n$ the imaginary quadrature phase error, by the magnitude of the imaginary quadrature phase error $\theta_{BQ}$ to obtain a sign and magnitude product defining the phase error of the real I PAM filtered signal $\theta_Q$ to provide the imaginary quadrature phase error $\epsilon_{odd}$.

The switches 66 and 72 clock at even number symbol boundaries as the 68 and 74 switches clock at odd number symbol boundaries. When the switch 66 is clocked, the real inphase phase $\theta_I$ is close to zero as a small phase shift. The larger and more out of phase is the real inphase phase $\theta_I$ respecting perfect timing, the larger is the imaginary phase error when switch 72 is clocked when the imaginary quadrature filtered signal $\theta_Q$ is at a maximum phase providing the bit estimate $\hat{B}_n$ providing the correct sign of the real inphase phase error. The I multiplier 78 multiplies the imaginary data estimate $\hat{B}_n$ by the real inphase phase $\theta_{AI}$ to obtain the sign and magnitude of the phase shift of the real inphase phase error $\epsilon_{even}$. When the switch 74 is clocked, the imaginary quadrature phase $\theta_Q$ is close to a zero as a small phase shift. The larger and more out of phase is the imaginary quadrature phase $\theta_Q$ respecting perfect timing, the larger is the real quadrature phase error when switch 68 is clocked when the real inphase phase filtered signal $\theta_Q$ is at a maximum phase providing the bit estimate $\hat{A}_n$ providing the correct sign of the imaginary quadrature phase error. The Q multiplier 80 multiplies the real data estimate $\hat{A}_n$ by the imaginary quadrature phase $\theta_{BQ}$ to obtain the sign and magnitude of the imaginary quadrature phase error $\epsilon_{odd}$. I multiplier 78 multiplies the sampled phase shift $\theta_{AI}$ with the $\hat{B}_n$ hard limited estimated data to provide the even phase error $\epsilon_{even}$, while a Q multiplier 80 multiplies the sampled phase shift $\theta_Q$ with the $\hat{A}_n$ hard limited estimated data to provide the odd phase error $\epsilon_{odd}$. The even and odd phase errors $\epsilon_{even}$ and $\epsilon_{odd}$ are summed by summer 82 to provide the total error signal $\epsilon_n$.

The GMSK signal starts at a zero phase for the first precoded symbol. Thereafter, the phase modulation is continuous and varies between +/−π/2. The hard limiters 70 and 76 provide respective data symbol estimates $\hat{A}_n$ and $\hat{B}_n$ at the symbol time T, and hence functions as first order data detectors through a defined relationship between the phase errors and the estimated data.

$\epsilon_n = \hat{B} \cos(\epsilon_n) + \sin(\epsilon_n)$; for n=even $\epsilon_n = \hat{A} \cos(\epsilon_n) + \sin(\epsilon_n)$; for n=odd A positive one estimate data corresponds to +π/2 phase rotation and a negative one corresponds to −π/2 phase rotation. At a symbol T, the multipliers 78 and 80, respectively, multiply the data estimates $\hat{B}_n$ and $\hat{A}_n$ by respective orthogonal phase errors $\theta_{AI}$ and $\theta_{BQ}$. The I multiplier 78 multiplies the imaginary quadrature data estimate $\hat{B}_n$ by the real inphase phase error $\theta_{AI}$, which is the real phase error at π/2 that is typically very small, for determining the real inphase even phase error $\epsilon_{even}$. Likewise, the Q multiplier 30 multiplies the real data estimate $\hat{A}_n$ by the imaginary quadrature phase error $\theta_{BQ}$, which is the real inphase phase error at π/2 that is also typically very small, for determining the imaginary quadrature odd phase error $\epsilon_{odd}$. The summer 82 adds the phase errors $\epsilon_{odd}$ and $\epsilon_{even}$ to provide the composite total error signal $\epsilon_n$.

The summer 82 receives the imaginary quadrature odd phase error $\epsilon_{odd}$ from multiplier 80 during odd symbol times (2k+1)T when the output from multiplier 78 is zero, assuming perfect timing, or is receiving the real inphase even phase error $\epsilon_{even}$ during even symbol times 2kT from the multiplier 78 when the output from the Q multiplier 80 is zero, assuming perfect timing. The summer 82 inverts the real inphase even phase error $\epsilon_{even}$ for proper summation. The real inphase even phase error $\epsilon_{even}$ is inverted so that when subtracted by summer 82, the real inphase even phase error $\epsilon_{even}$ is added to the imaginary quadrature odd phase error $\epsilon_{odd}$ to provide the total error signal $\epsilon_n$. The total error signal $\epsilon_n$ has a value of either +1 or −1 for each bit period. The loop filter 88 averages the total error value $\epsilon_n$ to provide a filter error value to the NCO 90 that translates the filter error value into a phase error estimate $\hat{\theta}_e$.

The error signal $\epsilon_n$ is a constant value over a symbol time duration T. The absolute value generator 84 desensitizes the $\epsilon_n$ error signal to noise spikes so that the error estimate is constantly nearly one during each symbol time period. The loop filter 88 digitally filters the error estimate $\hat{\epsilon}_n$ to provide a numerically controlled oscillator (NCO) 90 with a stable filtered phase error estimate. The NCO translates the filtered phase error estimate into the estimated phase error $\hat{\theta}_e$. The estimated phase error $\hat{\theta}_e$ is added to the carrier phase $\theta_c$ and this sum is then used by the phase demodulator 56 to correct the carrier phase for accurate closed loop phase demodulation of the receive signal baseband signal $R_o(t)$. The complex receive signal $R(t)$ can be expressed in terms of the real and imaginary parts.

$$e^{j\phi} = A_n + J\, B_n$$

The precoder 20 precodes the input data d(t) so that the signal magnitude of the filtered signals represent the input data d(t) at the odd and even sample times. Hence, the Data is present during odd and even samples, and can be sampled for improved phase demodulation. The data $\hat{B}_n$ and $\hat{A}_n$ sampled by switches 68 and 72 and hard limited by limiters 70 and 76 and the phases $\theta_{BQ}$ and $\theta_{AI}$ sampled by the switches 66 and 74 are then used by multipliers 80 and 78 and summer 82 to generate the phase error signal $\epsilon_n$. The error signal $\epsilon_n$ is in the form of a phase error.

$$e^{j\theta_e} = \cos(\theta_e) = j\sin(\theta_e)$$

$$e^{j(\phi+\theta_e)} = (A_n\cos(\theta_e) - B_n\cos(\theta_e)) + j(B_n\cos(\theta_e) + A_n\cos(\theta_e))$$

$$\varepsilon_n = \text{odd} = \text{Re}[e^{j(\phi+\theta_e)}] = A_n\cos(\theta_e) - B_n\cos(\theta_e)$$

$$\varepsilon_n = \text{even} = \text{Im}[e^{j(\phi+\theta_e)}] = B_n\cos(\theta_e) + A_n\cos(\theta_e)$$

$$\hat{\varepsilon}_n = \frac{(A_n\cos(\theta_e) - B_n\cos(\theta_e)) + j(B_n\cos(\theta_e) + A_n\cos(\theta_e))}{|e^{j(\phi+\theta_e)}|}$$

$$\hat{\varepsilon}_n \cong 2\sin(\theta_e)$$

The present invention is directed to a Laurent filtering GMSK carrier tracking loop operating at baseband for demodulating a received GMSK signal communicating precoded data, into a demodulated baseband received signal. No squaring of the received signal is required. The invention is characterized by separating the demodulating baseband receive signal into real and imaginary components both subjected to Laurent filtering to provide baseband soft data signals of encoded data subject to orthogonal switching and hard limiting to generate phase error signals at baseband for closed loop carrier phase tracking. The carrier tracking loop does provide estimates of the data sequence and could be modified to provide data estimates as part of data detection. Those skilled in the art can make enhancements, improvements, and modifications to the invention, and these enhancements, improvements, and modifications may nonetheless fall within the spirit and scope of the following claims.

What is claimed is:

1. A method of demodulating a received signal having a phase modulated carrier signal of a carrier signal modulated by symbols having a symbol time period, the symbols are generated from preceding an input data stream as a precoded input data stream, the method comprising the steps of, carrier demodulating the received signal by a carrier reference into a carrier demodulated signal, phase demodulating the carrier demodulated signal by a phase amount into a baseband received signal, converting the baseband received signal into an imaginary component and a real component, real filtering the real component into a real phase signal, imaginary filtering the imaginary component into an imaginary phase signal, even real sampling at even symbol time boundaries the real phase signal into a sampled even real phase signal, odd real sampling at odd symbol time boundaries the real phase signal into a sampled odd real phase signal, real hard limiting the sampled odd real phase signal into real data estimates, even imaginary sampling at even symbol time boundaries the imaginary phase signal into a sampled even imaginary phase signal, odd imaginary sampling at odd symbol time boundaries the imaginary phase signal into a sampled odd imaginary phase signal, imaginary hard limiting the sampled even imaginary phase signal into imaginary data estimates, the imaginary and real data estimates are alternating estimates of the input data stream, even phase multiplying the imaginary data estimates by the sampled even real phase signal for generating an even phase error, odd phase multiplying the real data estimates by the sampled odd imaginary phase signal for generating an odd phase error, combining the even and odd phase errors into a phase error estimate, and phase adjusting the phase amount by the phase error estimate for phase demodulation of the carrier demodulated signal during the phase demodulating step.

2. The method of claim 1 wherein, the precoded input data stream is Gaussian filtered to provide the received signal having a pulse amplitude modulation representation of the Gaussian filtering, the real and imaginary filtering steps are matched filtering steps that are matched by the pulse amplitude modulation representation to the Gaussian filtering, and the real and imaginary phase signals are filtered signals having an absolute phase at a periodic sampling time for indicating the data of the input data stream.

3. The method of claim 1 wherein, the precoded input data stream is Gaussian filtered to provide the received signal having a pulse amplitude modulation representation of the Gaussian filtering, the real and imaginary filtering steps are matched filtering steps that are matched by the pulse amplitude modulation representation to the Gaussian filtering, the real and imaginary phase signals are filtered signals having an absolute phase at a periodic sampling time for indicating the data of the input data stream, and the matched filtering steps apply a principal Laurent function to the baseband signal so that the real and imaginary filtered signal comprises a Laurent component.

4. The method of claim 1 wherein, the even phase multiplying step determines a phase difference between perfect demodulation of the imaginary data estimates and an actual demodulation of the imaginary data estimates, that difference being indicated by a sign of the sampled real phase signal for determining the sign of the even phase error, and the odd phase multiplying step determines a phase difference between perfect demodulation of the real data estimates and an actual demodulation of the real data estimates, that difference being indicated by a sign of the sampled imaginary phase signal for determining the sign of the odd phase error.

5. The method of claim 1 wherein the combining step comprises the steps of, summing the odd phase error and the even phase error into a summed phase error, absolute error generating an absolute phase error from the summed phase error, dividing the summed phase error by the absolute phase error for providing a constant phase error signal having a toggling sign, loop filtering the constant phase error to provide an error estimate, and generating the phase error estimate from the error estimate.

6. The method of claim 1 further comprising the step of, receiving a carrier phase estimate, the phase adjusting steps adjust the carrier phase estimate by the phase error estimate for determining the phase amount.

7. The method of claim 1 further comprising the step of, receiving the carrier reference as a carrier reference estimate of the carrier signal.

8. A method of generating an output data stream from a received signal having a phase modulated carrier signal of a carrier signal modulated by precoded symbols having a symbol time period, the symbols are generated from preceding an input data stream as a precoded input data stream, the method comprising the steps of, generating a carrier reference estimate from the received signal, generating a carrier phase estimate from the received signal, carrier demodulating the received signal by the carrier reference estimate into a carrier demodulated signal, phase demodulating the carrier demodulated signal by a phase amount into a baseband received signal, converting the baseband received signal into an imaginary component and a real component, real filtering the real component into a real phase signal, imaginary filtering the imaginary component into an imaginary phase signal, even real sampling at even symbol time boundaries the real phase signal into a sampled even real phase signal, odd real sampling at odd symbol time boundaries the real phase signal into a sampled odd real phase signal, real hard limiting the sampled odd real phase signal into real data estimates, even imaginary sampling at even symbol time boundaries the imaginary phase signal into a sampled even imaginary phase signal, odd imaginary sampling at odd symbol time boundaries the imaginary phase signal into a sampled odd imaginary phase signal, imaginary hard limiting the sampled even imaginary phase signal into imaginary data estimates, the imaginary and real data estimates are alternating estimates of the input data stream, even phase multiplying the imaginary data estimates by the sampled even real phase signal for generating an even phase error, odd phase multiplying the real data estimates by the sampled odd imaginary phase signal for generating an odd phase error, combining the even and odd phase errors into a phase error estimate, phase adjusting the phase amount by the phase error estimate for phase demodulation of the carrier demodulated signal during the phase demodulating step by adjusting the carrier phase estimate by the phase error estimate for determining the phase amount, and data detecting the baseband received signal into the output data stream being an estimate of the input data stream.

9. The method of claim 8 wherein, the precoded input data stream is Gaussian filtered to provide the received signal having a pulse amplitude modulation representation of the Gaussian filtering, the real and imaginary filtering steps are matched filtering steps that are matched by the pulse amplitude modulation representation to the Gaussian filtering, and the real and imaginary phase signals are filtered signals having an absolute phase at a periodic sampling time for indicating the data of the input data stream.

10. The method of claim 8 wherein, the precoded input data stream is Gaussian filtered to provide the received signal having a pulse amplitude modulation representation of the Gaussian filtering, the real and imaginary filtering steps are matched filtering steps that are matched by the pulse amplitude modulation representation to the Gaussian filtering, and the real and imaginary phase signals are filtered signals having an absolute phase at a periodic sampling time for indicating the data of the input data stream, and the matched filtering steps apply a principal Laurent function to the baseband signal so that the real and imaginary filtered signal comprises a Laurent component.

11. The method of claim 8 wherein, the even phase multiplying step determines a phase difference between perfect demodulation of the imaginary data estimates and an actual demodulation of the imaginary data estimates, that difference being indicated by a sign of the sampled real phase signal for determining the sign of the even phase error, and the odd phase multiplying step determines a phase difference between perfect demodulation of the real data estimates and an actual demodulation of the real data estimates, that difference being indicated by a sign of the sampled imaginary phase signal for determining the sign of the odd phase error.

12. The method of claim 8 wherein the combining step comprises the steps of, summing the odd phase error and the even phase error into a summed phase error, absolute error generating an absolute phase error from the summed phase error, dividing the summed phase error by the absolute phase error for providing a constant phase error signal having a toggling sign, loop filtering the constant phase error to provide an error estimate, and generating the phase error estimate from the error estimate.

13. The method of claim 8 further comprising the steps of, generating a timing estimate from the received signal, and generating a timing signal from the timing estimate and the baseband received signal, the timing estimate is a clocking signal for sampling the baseband received signal during the detecting step.

* * * * *